(12) United States Patent
Bulthuis

(10) Patent No.: US 9,494,735 B2
(45) Date of Patent: Nov. 15, 2016

(54) AWG SUPPORTING MULTIPLE FREQUENCY BANDS AND CHANNEL PLANS THROUGH RESPECTIVE MULTIPLE INPUTS

(75) Inventor: Hindrik Freerk Bulthuis, Apeldoorn (NL)

(73) Assignee: GEMFIRE CORPORATION, Santa Clara, CA (US)

( * ) Notice: Subject to any disclaimer, the term of this patent is extended or adjusted under 35 U.S.C. 154(b) by 675 days.

(21) Appl. No.: 13/271,886

(22) Filed: Oct. 12, 2011

(65) Prior Publication Data
US 2012/0087667 A1  Apr. 12, 2012

Related U.S. Application Data

(60) Provisional application No. 61/392,131, filed on Oct. 12, 2010.

(51) Int. Cl.
*G02B 6/12* (2006.01)
*H04J 14/02* (2006.01)

(52) U.S. Cl.
CPC ....... *G02B 6/12016* (2013.01); *G02B 6/12014* (2013.01); *H04J 14/0282* (2013.01)

(58) Field of Classification Search
None
See application file for complete search history.

(56) References Cited

U.S. PATENT DOCUMENTS

| | | | |
|---|---|---|---|
| 5,002,350 A | | 3/1991 | Dragone |
| 5,978,532 A | * | 11/1999 | Rigny et al. ................... 385/46 |
| 6,181,849 B1 | | 1/2001 | Lin et al. |
| 6,608,948 B2 | | 8/2003 | Delisle et al. |
| 6,678,446 B1 | * | 1/2004 | McGreer et al. ............... 385/37 |
| 7,397,986 B2 | | 7/2008 | Bulthuis et al. |
| 7,440,655 B2 | * | 10/2008 | Grek et al. ....................... 385/37 |
| 7,492,991 B2 | | 2/2009 | Beelen et al. |
| 8,285,144 B2 | * | 10/2012 | Yamada et al. ................. 398/79 |
| 2004/0264857 A1 | | 12/2004 | Bernasconi |
| 2005/0152641 A1 | | 7/2005 | Han et al. |
| 2007/0065076 A1 | * | 3/2007 | Grek et al. ....................... 385/37 |
| 2011/0052189 A1 | * | 3/2011 | Yamada et al. ................. 398/42 |
| 2012/0087667 A1 | * | 4/2012 | Bulthuis .......................... 398/79 |

FOREIGN PATENT DOCUMENTS

| | | |
|---|---|---|
| KR | 20050092684 A | 9/2005 |
| WO | 9723969 A1 | 7/1997 |
| WO | 2010099251 A2 | 9/2010 |

OTHER PUBLICATIONS

Lin et al., "Dual-Channel-Spacing Phased-Array Waveguide Grating Multi/Demultiplexers", IEEE Photonics Technology Letters, vol. 8, No. 11, Nov. 1996.*

(Continued)

*Primary Examiner* — Andrew Jordan
(74) *Attorney, Agent, or Firm* — Haynes Beffel Wolfeld LLP

(57) ABSTRACT

Roughly described, an AWG has two or more inputs and multiple outputs. By selecting the angular spacing among the inputs, and by designing the different inputs to address different orders of the waveguide array, the device can be designed such that the inputs will carry frequency bands having any desired center frequency spacing and any desired same or different channel spacing. For example a dual input device can be designed such that one input carries C-band channels and the other input carries L-band channels, and both have channel spacings that match or substantially match the ITU grid.

27 Claims, 14 Drawing Sheets

(56) References Cited

OTHER PUBLICATIONS

Smit, M.K., "PHASAR-based WDM-Devices: Principles, Design and Applications", IEEE Journal of Selected Topics in Quantum Electronics vol. 2, No. 2, Jun. 1996, 15pp.
International Search Report mailed May 30, 2012 in PCT/US2011/055982.
Smit & Dam, "PHASAR-Based WDM-Devices: Principles, Design and Applications," IEEE JQE (2) 2, 1996, 22 pages.
Amersfoort, M., "Arrayed Waveguide Grating," Application Note A1998003, Jun. 15, 1998, 24 pages.
EP 11833344.2—Extended European Search Report dated Feb. 4, 2015, 8 pages.
Amersfoort, M., "Arrayed Waveguide Grating," Appication Note A1998003, Jun. 15, 1998, 24 pages.
Photonic Networks, Optical Technology and Infrastructure, Faulkner and Harmer, eds., IOS Press, Proceedings of the European Conference on Networks and Optical Communications, 1997.

* cited by examiner

ITU Grid Specification

| | L-Band | | | | C-Band | | | | S-Band | | | |
|---|---|---|---|---|---|---|---|---|---|---|---|---|
| | 100 GHz Grid | | 50 GHz Offset | | 100 GHz Grid | | 50 GHz Offset | | 100 GHz Grid | | 50 GHz Offset | |
| | THz | nm | THz | nm | THz | nm | THz | nm | THz | nm | THz | nm |
| 1 | 186.00 | 1611.79 | 186.05 | 1611.35 | 191.00 | 1569.59 | 191.05 | 1569.18 | 196.00 | 1529.55 | 196.05 | 1529.16 |
| 2 | 186.10 | 1610.92 | 186.15 | 1610.49 | 191.10 | 1568.77 | 191.15 | 1568.36 | 196.10 | 1528.77 | 196.15 | 1528.38 |
| 3 | 186.20 | 1610.06 | 186.25 | 1609.62 | 191.20 | 1567.95 | 191.25 | 1567.54 | 196.20 | 1527.99 | 196.25 | 1527.60 |
| 4 | 186.30 | 1609.19 | 186.35 | 1608.76 | 191.30 | 1567.13 | 191.35 | 1566.72 | 196.30 | 1527.22 | 196.35 | 1526.83 |
| 5 | 186.40 | 1608.33 | 186.45 | 1607.90 | 191.40 | 1566.31 | 191.45 | 1565.90 | 196.40 | 1526.44 | 196.45 | 1526.05 |
| 6 | 186.50 | 1607.47 | 186.55 | 1607.04 | 191.50 | 1565.50 | 191.55 | 1565.09 | 196.50 | 1525.66 | 196.55 | 1525.27 |
| 7 | 186.60 | 1606.60 | 186.65 | 1606.17 | 191.60 | 1564.68 | 191.65 | 1564.27 | 196.60 | 1524.89 | 196.65 | 1524.50 |
| 8 | 186.70 | 1605.74 | 186.75 | 1605.31 | 191.70 | 1563.86 | 191.75 | 1563.45 | 196.70 | 1524.11 | 196.75 | 1523.72 |
| 9 | 186.80 | 1604.88 | 186.85 | 1604.46 | 191.80 | 1563.05 | 191.85 | 1562.64 | 196.80 | 1523.34 | 196.85 | 1522.95 |
| 10 | 186.90 | 1604.03 | 186.95 | 1603.60 | 191.90 | 1562.23 | 191.95 | 1561.83 | 196.90 | 1522.56 | 196.95 | 1522.18 |
| 11 | 187.00 | 1603.17 | 187.05 | 1602.74 | 192.00 | 1561.42 | 192.05 | 1561.01 | 197.00 | 1521.79 | 197.05 | 1521.40 |
| 12 | 187.10 | 1602.31 | 187.15 | 1601.88 | 192.10 | 1560.61 | 192.15 | 1560.20 | 197.10 | 1521.02 | 197.15 | 1520.63 |
| 13 | 187.20 | 1601.46 | 187.25 | 1601.03 | 192.20 | 1559.79 | 192.25 | 1559.39 | 197.20 | 1520.25 | 197.25 | 1519.86 |
| 14 | 187.30 | 1600.60 | 187.35 | 1600.17 | 192.30 | 1558.98 | 192.35 | 1558.58 | 197.30 | 1519.48 | 197.35 | 1519.09 |
| 15 | 187.40 | 1599.75 | 187.45 | 1599.32 | 192.40 | 1558.17 | 192.45 | 1557.77 | 197.40 | 1518.71 | 197.45 | 1518.32 |
| 16 | 187.50 | 1598.89 | 187.55 | 1598.47 | 192.50 | 1557.36 | 192.55 | 1556.96 | 197.50 | 1517.94 | 197.55 | 1517.55 |
| 17 | 187.60 | 1598.04 | 187.65 | 1597.62 | 192.60 | 1556.55 | 192.65 | 1556.15 | 197.60 | 1517.17 | 197.65 | 1516.78 |
| 18 | 187.70 | 1597.19 | 187.75 | 1596.76 | 192.70 | 1555.75 | 192.75 | 1555.34 | 197.70 | 1516.40 | 197.75 | 1516.02 |
| 19 | 187.80 | 1596.34 | 187.85 | 1595.91 | 192.80 | 1554.94 | 192.85 | 1554.54 | 197.80 | 1515.63 | 197.85 | 1515.25 |
| 20 | 187.90 | 1595.49 | 187.95 | 1595.06 | 192.90 | 1554.13 | 192.95 | 1553.73 | 197.90 | 1514.87 | 197.95 | 1514.49 |
| 21 | 188.00 | 1594.64 | 188.05 | 1594.22 | 193.00 | 1553.33 | 193.05 | 1552.93 | 198.00 | 1514.10 | 198.05 | 1513.72 |
| 22 | 188.10 | 1593.79 | 188.15 | 1593.37 | 193.10 | 1552.52 | 193.15 | 1552.12 | 198.10 | 1513.34 | 198.15 | 1512.96 |
| 23 | 188.20 | 1592.95 | 188.25 | 1592.52 | 193.20 | 1551.72 | 193.25 | 1551.32 | 198.20 | 1512.58 | 198.25 | 1512.19 |
| 24 | 188.30 | 1592.10 | 188.35 | 1591.68 | 193.30 | 1550.92 | 193.35 | 1550.52 | 198.30 | 1511.81 | 198.35 | 1511.43 |
| 25 | 188.40 | 1591.26 | 188.45 | 1590.83 | 193.40 | 1550.12 | 193.45 | 1549.72 | 198.40 | 1511.05 | 198.45 | 1510.67 |
| 26 | 188.50 | 1590.41 | 188.55 | 1589.99 | 193.50 | 1549.32 | 193.55 | 1548.91 | 198.50 | 1510.29 | 198.55 | 1509.91 |
| 27 | 188.60 | 1589.57 | 188.65 | 1589.15 | 193.60 | 1548.51 | 193.65 | 1548.11 | 198.60 | 1509.53 | 198.65 | 1509.15 |
| 28 | 188.70 | 1588.73 | 188.75 | 1588.30 | 193.70 | 1547.72 | 193.75 | 1547.32 | 198.70 | 1508.77 | 198.75 | 1508.39 |
| 29 | 188.80 | 1587.88 | 188.85 | 1587.46 | 193.80 | 1546.92 | 193.85 | 1546.52 | 198.80 | 1508.01 | 198.85 | 1507.63 |
| 30 | 188.90 | 1587.04 | 188.95 | 1586.62 | 193.90 | 1546.12 | 193.95 | 1545.72 | 198.90 | 1507.25 | 198.95 | 1506.87 |

*FIG. 1*

| | | | | | | | | | | | |
|---|---|---|---|---|---|---|---|---|---|---|---|
| 31 | 189.00 | 1586.20 | 189.05 | 1585.78 | 194.00 | 1545.32 | 194.05 | 1506.49 | 199.00 | 1506.49 | 199.05 | 1506.12 |
| 32 | 189.10 | 1585.36 | 189.15 | 1584.95 | 194.10 | 1544.53 | 194.15 | 1505.74 | 199.10 | 1505.74 | 199.15 | 1505.36 |
| 33 | 189.20 | 1584.53 | 189.25 | 1584.11 | 194.20 | 1543.73 | 194.25 | 1504.98 | 199.20 | 1504.98 | 199.25 | 1504.60 |
| 34 | 189.30 | 1583.69 | 189.35 | 1583.27 | 194.30 | 1542.94 | 194.35 | 1504.23 | 199.30 | 1504.23 | 199.35 | 1503.85 |
| 35 | 189.40 | 1582.85 | 189.45 | 1582.44 | 194.40 | 1542.14 | 194.45 | 1503.47 | 199.40 | 1503.47 | 199.45 | 1503.10 |
| 36 | 189.50 | 1582.02 | 189.55 | 1581.60 | 194.50 | 1541.35 | 194.55 | 1502.72 | 199.50 | 1502.72 | 199.55 | 1502.34 |
| 37 | 189.60 | 1581.18 | 189.65 | 1580.77 | 194.60 | 1540.56 | 194.65 | 1501.97 | 199.60 | 1501.97 | 199.65 | 1501.59 |
| 38 | 189.70 | 1580.35 | 189.75 | 1579.93 | 194.70 | 1539.77 | 194.75 | 1501.21 | 199.70 | 1501.21 | 199.75 | 1500.84 |
| 39 | 189.80 | 1579.52 | 189.85 | 1579.10 | 194.80 | 1538.98 | 194.85 | 1500.46 | 199.80 | 1500.46 | 199.85 | 1500.09 |
| 40 | 189.90 | 1578.69 | 189.95 | 1578.27 | 194.90 | 1538.19 | 194.95 | 1499.71 | 199.90 | 1499.71 | 199.95 | 1499.34 |
| 41 | 190.00 | 1577.86 | 190.05 | 1577.44 | 195.00 | 1537.40 | 195.05 | 1537.00 | 200.00 | 1498.96 | 200.05 | 1498.59 |
| 42 | 190.10 | 1577.03 | 190.15 | 1576.61 | 195.10 | 1536.61 | 195.15 | 1536.22 | 200.10 | 1498.21 | 200.15 | 1497.84 |
| 43 | 190.20 | 1576.20 | 190.25 | 1575.78 | 195.20 | 1535.82 | 195.25 | 1535.43 | 200.20 | 1497.46 | 200.25 | 1497.09 |
| 44 | 190.30 | 1575.37 | 190.35 | 1574.95 | 195.30 | 1535.04 | 195.35 | 1534.64 | 200.30 | 1496.72 | 200.35 | 1496.34 |
| 45 | 190.40 | 1574.54 | 190.45 | 1574.13 | 195.40 | 1534.25 | 195.45 | 1533.86 | 200.40 | 1495.97 | 200.45 | 1495.60 |
| 46 | 190.50 | 1573.71 | 190.55 | 1573.30 | 195.50 | 1533.47 | 195.55 | 1533.07 | 200.50 | 1495.22 | 200.55 | 1494.85 |
| 47 | 190.60 | 1572.89 | 190.65 | 1572.48 | 195.60 | 1532.68 | 195.65 | 1532.29 | 200.60 | 1494.48 | 200.65 | 1494.11 |
| 48 | 190.70 | 1572.06 | 190.75 | 1571.65 | 195.70 | 1531.90 | 195.75 | 1531.51 | 200.70 | 1493.73 | 200.75 | 1493.36 |
| 49 | 190.80 | 1571.24 | 190.85 | 1570.83 | 195.80 | 1531.12 | 195.85 | 1530.72 | 200.80 | 1492.99 | 200.85 | 1492.62 |
| 50 | 190.90 | 1570.42 | 190.95 | 1570.01 | 195.90 | 1530.33 | 195.95 | 1529.94 | 200.90 | 1492.25 | 200.95 | 1491.88 |

*FIG. 1*
(Continued)

| OP | 1.5% contrast | | 0.7% contrast | |
|---|---|---|---|---|
| | order 38 Cband | Order 37 Lband | order 38 Cband | Order 37 Lband |
| 1 | 192 | 187,053 | 192 | 187,029 |
| 2 | 192,1 | 187,150 | 192,1 | 187,126 |
| 3 | 192,2 | 187,248 | 192,2 | 187,224 |
| 4 | 192,3 | 187,345 | 192,3 | 187,321 |
| 5 | 192,4 | 187,443 | 192,4 | 187,418 |
| 6 | 192,5 | 187,540 | 192,5 | 187,516 |
| 7 | 192,6 | 187,637 | 192,6 | 187,613 |
| 8 | 192,7 | 187,735 | 192,7 | 187,711 |
| 9 | 192,8 | 187,832 | 192,8 | 187,808 |
| 10 | 192,9 | 187,929 | 192,9 | 187,905 |
| 11 | 193 | 188,027 | 193 | 188,003 |
| 12 | 193,1 | 188,124 | 193,1 | 188,100 |
| 13 | 193,2 | 188,221 | 193,2 | 188,197 |
| 14 | 193,3 | 188,319 | 193,3 | 188,295 |
| 15 | 193,4 | 188,416 | 193,4 | 188,392 |
| 16 | 193,5 | 188,514 | 193,5 | 188,490 |
| 17 | 193,6 | 188,611 | 193,6 | 188,587 |
| 18 | 193,7 | 188,708 | 193,7 | 188,684 |
| 19 | 193,8 | 188,806 | 193,8 | 188,782 |
| 20 | 193,9 | 188,903 | 193,9 | 188,879 |
| 21 | 194 | 189,000 | 194 | 188,977 |
| 22 | 194,1 | 189,098 | 194,1 | 189,074 |
| 23 | 194,2 | 189,195 | 194,2 | 189,171 |
| 24 | 194,3 | 189,292 | 194,3 | 189,269 |
| 25 | 194,4 | 189,390 | 194,4 | 189,366 |
| 26 | 194,5 | 189,487 | 194,5 | 189,463 |
| 27 | 194,6 | 189,585 | 194,6 | 189,661 |
| 28 | 194,7 | 189,682 | 194,7 | 189,668 |
| 29 | 194,8 | 189,779 | 194,8 | 189,756 |
| 30 | 194,9 | 189,877 | 194,9 | 189,853 |
| 31 | 195 | 189,974 | 195 | 189,950 |
| 32 | 195,1 | 190,071 | 195,1 | 190,048 |
| 33 | 195,2 | 190,169 | 195,2 | 190,145 |
| 34 | 195,3 | 190,266 | 195,3 | 190,242 |
| 35 | 195,4 | 190,364 | 195,4 | 190,340 |
| 36 | 195,5 | 190,461 | 195,5 | 190,437 |
| 37 | 195,6 | 190,558 | 195,6 | 190,535 |
| 38 | 195,7 | 190,656 | 195,7 | 190,632 |
| 39 | 195,8 | 190,753 | 195,8 | 190,729 |
| 40 | 195,9 | 190,850 | 195,9 | 190,827 |

*FIG. 2*

|  |  | C-band |  | L-band |  |
|---|---|---|---|---|---|
| angle | OP | IP 1 order M (20) | IP2 order M-1 (19) | IP1 order M-1 (19) | IP2 order M (20) |
| -0,043481 | 1 | 192,000 | 187,102 | 182,601 | 196,738 |
| -0,041207 | 2 | 192,100 | 187,202 | 182,696 | 196,843 |
| -0,038936 | 3 | 192,200 | 187,302 | 182,791 | 196,948 |
| -0,036667 | 4 | 192,300 | 187,402 | 182,886 | 197,053 |
| -0,034401 | 5 | 192,400 | 187,502 | 182,981 | 197,158 |
| -0,032137 | 6 | 192,500 | 187,602 | 183,076 | 197,263 |
| -0,029876 | 7 | 192,600 | 187,701 | 183,171 | 197,368 |
| -0,027618 | 8 | 192,700 | 187,801 | 183,266 | 197,473 |
| -0,25362 | 9 | 192,800 | 187,901 | 183,361 | 197,579 |
| -0,23108 | 10 | 192,900 | 188,001 | 183,456 | 197,684 |
| -0,20858 | 11 | 193,000 | 188,101 | 183,551 | 197,789 |
| -0,018609 | 12 | 193,100 | 188,201 | 183,646 | 197,894 |
| -0,016363 | 13 | 193,200 | 188,301 | 183,741 | 197,999 |
| -0,01412 | 14 | 193,300 | 188,401 | 183,836 | 198,104 |
| -0,011879 | 15 | 193,400 | 188,500 | 183,931 | 198,209 |
| -0,00964 | 16 | 193,500 | 188,600 | 184,026 | 198,315 |
| -0,007404 | 17 | 193,600 | 188,700 | 184,121 | 198,420 |
| -0,00517 | 18 | 193,700 | 188,800 | 184,216 | 198,525 |
| -0,002938 | 19 | 193,800 | 188,900 | 184,311 | 198,630 |
| -0,000709 | 20 | 193,900 | 189,000 | 184,406 | 198,735 |
| 0,001517 | 21 | 194,000 | 189,100 | 184,501 | 198,840 |
| 0,003742 | 22 | 194,100 | 189,200 | 184,596 | 198,946 |
| 0,005964 | 23 | 194,200 | 189,300 | 184,691 | 199,051 |
| 0,008184 | 24 | 194,300 | 189,400 | 184,786 | 199,156 |
| 0,010401 | 25 | 194,400 | 189,499 | 184,881 | 199,261 |
| 0,012616 | 26 | 194,500 | 189,599 | 184,976 | 199,366 |
| 0,014829 | 27 | 194,600 | 189,699 | 185,071 | 199,471 |
| 0,01704 | 28 | 194,700 | 189,799 | 185,166 | 199,577 |
| 0,019249 | 29 | 194,800 | 189,899 | 185,261 | 199,682 |
| 0,021455 | 30 | 194,900 | 189,999 | 185,356 | 199,787 |
| 0,023659 | 31 | 195,000 | 190,099 | 185,451 | 199,892 |
| 0,025861 | 32 | 195,100 | 190,199 | 185,546 | 199,997 |
| 0,02806 | 33 | 195,200 | 190,299 | 185,641 | 200,102 |
| 0,030258 | 34 | 195,300 | 190,399 | 185,736 | 200,208 |
| 0,032453 | 35 | 195,400 | 190,499 | 185,831 | 200,313 |
| 0,034646 | 36 | 195,500 | 190,599 | 185,926 | 200,418 |
| 0,036837 | 37 | 195,600 | 190,699 | 186,021 | 200,523 |
| 0,039026 | 38 | 195,700 | 190,799 | 186,116 | 200,628 |
| 0,041213 | 39 | 195,800 | 190,899 | 186,211 | 200,734 |
| 0,043398 | 40 | 195,900 | 190,998 | 186,306 | 200,839 |

*FIG. 9*

|  | Blue | Red | | |
|---|---|---|---|---|
| OP | IP 1 order M (40) | IP2 order M-1 (39) | IP1 order M-1 (39) | IP2 order M (40) |
| 1 | 192,900 | 190,500 | 188,178 | 195,281 |
| 2 | 193,000 | 190,600 | 188,276 | 195,384 |
| 3 | 193,100 | 190,700 | 188,373 | 195,487 |
| 4 | 193,200 | 190,800 | 188,471 | 195,589 |
| 5 | 193,300 | 190,900 | 188,568 | 195,692 |
| 6 | 193,400 | 191,000 | 188,666 | 195,794 |
| 7 | 193,500 | 191,100 | 188,763 | 195,897 |
| 8 | 193,600 | 191,200 | 188,861 | 195,999 |
| 9 | 193,700 | 191,300 | 188,958 | 196,102 |
| 10 | 193,800 | 191,400 | 189,056 | 196,204 |
| 11 | 193,900 | 191,500 | 189,153 | 196,307 |
| 12 | 194,000 | 191,600 | 189,251 | 196,409 |
| 13 | 194,100 | 191,700 | 189,348 | 196,512 |
| 14 | 194,200 | 191,800 | 189,446 | 196,615 |
| 15 | 194,300 | 191,900 | 189,543 | 196,717 |
| 16 | 194,400 | 192,000 | 189,641 | 196,820 |
| 17 | 194,500 | 192,100 | 189,738 | 196,922 |
| 18 | 194,600 | 192,200 | 189,836 | 197,025 |
| 19 | 194,700 | 192,300 | 189,933 | 197,127 |
| 20 | 194,800 | 192,400 | 190,031 | 197,230 |
| 21 | 194,900 | 192,500 | 190,128 | 197,332 |
| 22 | 195,000 | 192,600 | 190,226 | 197,435 |
| 23 | 195,100 | 192,700 | 190,323 | 197,538 |
| 24 | 195,200 | 192,800 | 190,421 | 197,640 |
| 25 | 195,300 | 192,900 | 190,518 | 197,743 |
| 26 | 195,400 | 193,000 | 190,616 | 197,845 |
| 27 | 195,500 | 193,100 | 190,713 | 197,948 |
| 28 | 195,600 | 193,200 | 190,811 | 198,050 |
| 29 | 195,700 | 193,300 | 190,908 | 198,153 |
| 30 | 195,800 | 193,400 | 191,006 | 198,256 |
| 31 | 195,900 | 193,500 | 191,103 | 198,358 |
| 32 | 196,000 | 193,600 | 191,201 | 198,461 |
| 33 | 196,100 | 193,700 | 191,298 | 198,563 |
| 34 | 196,200 | 193,800 | 191,396 | 198,666 |
| 35 | 196,300 | 193,900 | 191,493 | 198,769 |
| 36 | 196,400 | 194,000 | 191,591 | 198,871 |
| 37 | 196,500 | 194,100 | 191,688 | 198,974 |
| 38 | 196,600 | 194,200 | 191,786 | 199,076 |
| 39 | 196,700 | 194,300 | 191,883 | 199,179 |
| 40 | 196,800 | 194,400 | 191,981 | 199,281 |
| 41 | 196,900 | 194,500 | 192,078 | 199,384 |
| 42 | 197,000 | 194,600 | 192,176 | 199,487 |
| 43 | 197,100 | 194,700 | 192,273 | 199,589 |
| 44 | 197,200 | 194,800 | 192,371 | 199,692 |
| 45 | 197,300 | 194,900 | 192,468 | 199,794 |
| 46 | 197,400 | 195,000 | 192,566 | 199,897 |
| 47 | 197,500 | 195,100 | 192,663 | 200,000 |
| 48 | 197,600 | 195,200 | 192,761 | 200,102 |

*FIG. 10*

AWG SUPPORTING MULTIPLE FREQUENCY BANDS AND CHANNEL PLANS THROUGH RESPECTIVE MULTIPLE INPUTS

CROSS-REFERENCE TO OTHER APPLICATIONS

Applicants hereby claim the benefit under 35 U.S.C. 119(e) of U.S. provisional application No. 61/392,131, filed 12 Oct. 2010. The provisional application is hereby incorporated by reference herein in its entirety.

BACKGROUND

1. Field of the Invention

The invention relates generally to optical waveguide grating devices, and more particularly to a device that simultaneously supports more than one frequency band with accurate channel spacing.

2. Description of Related Art

Computer and communication systems place an ever-increasing demand upon communication link bandwidths. It is generally known that optical fibers offer a much higher bandwidth than conventional coaxial links. Further, a single optical channel in a fiber waveguide uses a small fraction of the available bandwidth of the fiber. In wavelength division multiplexed (WDM) optical communication systems, multiple optical wavelength carriers transmit independent communication channels along a single optical fiber. By transmitting several channels at different wavelengths into one fiber, the bandwidth capability of an optical fiber is efficiently utilized.

Fiber-optic multiplexing and demultiplexing have been accomplished using an arrayed waveguide grating (AWG) device. An AWG is a planar structure comprising an array of waveguides disposed between input and output couplers and arranged side-by-side with each other, and which together act like a diffraction grating in a spectrometer. Each of the waveguides differs in length with respect to its nearest neighbor by a predetermined fixed amount. The outputs of the output coupler form the outputs of the multiplexing and demultiplexing device. In operation, when a plurality of separate and distinct wavelengths are applied to separate and distinct input ports of the device, they are combined and are transmitted to an output port. The same device may also perform a demultiplexing function in which a plurality of input wavelengths on one input port of the apparatus, are separated from each other and directed to predetermined different ones of the output ports. AWGs can also perform a routing function, in which signals arrive on multiple input ports and are routed to multiple different output ports in accordance with a predefined mapping. The construction and operation of such AWGs is well known in the art. See for example, "PHASAR-based WDM-Devices: Principles, Design and Applications", M K Smit, IEEE Journal of Selected Topics in Quantum Electronics Vol. 2, No. 2, June 1996; U.S. Pat. Nos. 5,002,350; 7,397,986; 7,492,991; and WO97/23969, all incorporated by reference herein.

AWGs are often used in WDM-PON (wavelength division multiplexing passive optical network) systems. A typical PON has an optical line terminal (OLT) at the service provider's central office and a number of optical network units (ONUs) near end users. Each OLT and ONU includes one or more AWGs, so that multiple channels on different transmission frequencies can be carried on a single fiber. The AWGs multiplex the channels from multiple inputs at one end, and demultiplex them into multiple outputs at the other end. In order to permit such systems to be deployed with AWGs from a variety of vendors, several wavelength "bands" have been defined, and the channel spacing within each band has also been defined. These definitions have been incorporated into standards mainly under the auspices of the International Telecommunications Union (ITU). The following spectral bands have been defined in ITU specifications:

| Classification of spectral bands | | |
| --- | --- | --- |
| Band | Descriptor | Range [nm] |
| O-band | Original | 1260 to 1360 |
| E-band | Extended | 1360 to 1460 |
| S-band | Short wavelength | 1460 to 1530 |
| C-band | Conventional/Center | 1530 to 1565 |
| L-band | Long wavelength | 1565 to 1625 |
| U-band | Ultra long wavelength | 1625 to 1675 |

The channel plans specified for three of these bands (L-, C- and S-Bands) are set forth in FIG. 1. It can be seen that channels are defined at 50 GHz intervals, though a typical system would use channels at 100 GHz spacing: either on multiples of 100 GHz or at a 50 GHz offset from multiples of 100 GHz.

Though the ITU grid shows as many as 50 channels usable in each band, for some applications it is desirable to carry channels in two or more bands. For example, it is often proposed in literature to use AWGs in a bidirectional transmission system, with one band of frequencies for upstream traffic, from ONU to OLT, and another band of frequencies for downstream traffic, from OLT to ONU. This can be achieved by using two separate AWGs on each end of the transmission path, one designed for each of the two bands. The multiplexed outputs of the two AWGs on one end are either carried separately to the other end on two separate fibers, or are combined onto a single fiber using a WDM filter/combiner. However, it would be preferable if a single AWG could suffice on each end. It is possible to use a single AWG to multiplex/demultiplex signals in more than one band, but a number of problems arise.

First, in a conventional AWG, the channel spacing is proportional to the order addressed by the AWG. For example, designs have been made which can be deployed in both the C-band and L-band using order 38 and order 37 respectively. But if the design addresses the ITU-grid with channel spacing of 100 GHz using AWG-order 38 in the C-band, then the same AWG would have a channel spacing of 37/38*100=97.4 GHz, operating on order 37, in the L-band. It would deviate from the ITU specification and therefore be incompatible with AWGs on the far end of the transmission path that are designed for the standard 100 GHz spacing.

It has consequently been proposed to change the ITU specification to allow an off-grid channel spacing for the second band. But this creates another problem in that it is difficult to standardize the second channel plan. This is due to the fact that the two bands of frequencies, in particular the separation between the two bands, is defined by technology parameters used in the manufacture of the AWG, such as the material and waveguide dispersion, which vary from manufacturer to manufacturer.

To illustrate this point, FIG. 2 is a table illustrating the channel plans of two different AWGs, both using Silica on Silicon technologies but slightly different doping levels. One technology achieves a 0.7% contrast between core and cladding and the other achieves a 1.5% index-contrast between core and cladding. The 0.7% contrast technology has waveguides with a 6×6 um core and the 1.5% technology has waveguides which are 4 um square. For these two technologies, for wavelength around 1550 nm, the sum of material and waveguide dispersion are given by $$\frac{dN}{d\lambda} = -0.020 \mu m^{-1} \text{ and } \frac{dN}{d\lambda} = -0.015 \mu m^{-1}$$

for high and low contrast respectively. All frequencies in the table are in THz.

It can be seen that both AWGs are designed for 100 GHz on-grid channel spacing on order 38 in the C-band. But the resulting L-Band channel plans are different. The L-band channels for the higher contrast technology is 24 GHz higher than for low contrast technology. Therefore a WDM-PON AWG made in one technology will not be compatible in the L-band with a WDM-PON AWG made in the other technology. This is one of the reasons why it has been difficult to define an industry standard for the channel plan for WDM-PON telecom systems. Furthermore, even if all manufacturers can agree on one off-grid channel plan for the second frequency band, that plan will soon become obsolete as future improvements in manufacturing technologies dictate still different channel plans for the second channel.

SUMMARY

An opportunity therefore arises to develop ways to design a single AWG which operates at the correct channel spacing in two or more frequency bands simultaneously.

Roughly described, the invention involves arrayed waveguide grating apparatus having an input free-space region, an output free-space region, and an array of waveguides from the input free-space region to the output free-space region, wherein the input free-space region has an input port comprising at least first and second inputs, wherein the output free-space region has an output port comprising a plurality of outputs, wherein the first and second input ports address respectively first and second different orders $M_1$ and $M_2$ of the waveguide array, wherein the plurality of outputs and the first input are disposed such that optical energy provided on the first input will appear on the outputs with a first center frequency $v_1 N_1$ and first channel spacing $\Delta(v_1 N_1)$ among the outputs, $N_1$ being the effective index of refraction of a waveguide in the waveguide array at frequency $v_1$, the outputs being positioned for constant channel spacing between each pair of adjacent ones of the plurality of outputs when operated at the first center frequency, and wherein the second input is disposed such that optical energy provided on the second input will appear on the plurality of outputs with a desired second center frequency $v_2 N_2$ and second channel spacing $\Delta(v_2 N_2)$ among the outputs.

Preferably, the first and second inputs are disposed across the input free-space region from the array at angles $\theta_{IP1}$ and $\theta_{IP2}$ measured relative to where the array centerline meets the input free-space region, where $\theta_{IP1}$ and $\theta_{IP2}$ substantially satisfy $$\frac{M_2}{v_2 N_2} - \frac{M_1}{v_1 N_1} = \frac{d_a}{c}\left(\frac{N_{s2}}{N_2}\sin\theta_{IP2} - \frac{N_{s1}}{N_1}\sin\theta_{IP1}\right),$$

where $d_a$ is a pitch of the array waveguides where they meet the input free space region, where c is the speed of light, and where $N_{s1}$ is the effective index of refraction in the input free space region at frequency $v_1$, $N_{s2}$ is the effective index of refraction in the input free space region at frequency $v_2$, $N_1$ the effective index of refraction of a waveguide in the waveguide array at frequency $v_1$, $N_2$ the effective index of refraction of a waveguide in the waveguide array at frequency $v_2$, and where $\Delta(v_1 N_1)/\Delta(v_2 N_2)$ substantially satisfies $$\frac{v_2 N_2 - v_1 N_1}{v_1 N_1} = \frac{\Delta(v_2 N_2)}{\kappa \Delta(v_1 N_1)} + \left(1 - \frac{1}{\kappa}\right)\frac{M_2}{M_1} - 1$$

with.

$$\kappa = 2\left(1 + \frac{M_1}{M_2}\frac{v_2 N_2 - v_1 N_1}{v_1 N_1} + \frac{M_1 - M_2}{M_2}\right)$$

The first and second center frequencies may be in different ones of the ITU-defined frequency bands, for example in respectively the C-band and L-band. As another example, they may be located in two different sub-bands of a single one of the ITU-defined frequency bands.

Preferably the first and second orders are related as $M_2 = M_1 - 1$.

In an embodiment, the first and second channel spacings are substantially equal to each other. Preferably they are both equal to 50 GHz, and the first and second center frequencies both lie substantially on multiples of 50 GHz. In another embodiment, the first and second channel spacings are both substantially equal to 50 GHz and the first and second center frequencies both lie on multiples of 50 GHz. In yet another embodiment, the first and second channel spacings are both substantially equal to 50 GHz and the first and second center frequencies both lie substantially on multiples of 50 GHz.

The AWGs are operated so as to carry channels from both bands simultaneously.

The AWGs may also be implemented in a system that includes a first AWG having a plurality of inputs and a set of at least first and second outputs and a second AWG having at least first and second inputs and a plurality of outputs, for use with a transmission path carrying first optical energy from the first output of the first AWG to the first input of the second AWG and from the second output of the first AWG to the second input of the second AWG. The first and second outputs of the first AWG address respectively first and second different orders of the first AWG such that optical energy carried on the first output of the first AWG has a plurality of channels having first desired channel spacing and a first desired center frequency and at the same time optical energy carried on the second output of the first AWG has a plurality of channels having second desired channel spacing and a second desired center frequency. Similarly, the first and second inputs of the second AWG address respectively first and second different orders of the second AWG such that optical energy carried on the first input of the second AWG has a plurality of channels having the first channel spacing and the first center frequency and at the same time optical energy carried on the second input of the second AWG has a plurality of channels having the second channel spacing and the second center frequency. The first and second AWGs may be fabricated with the same or different technology parameters, and the first and second orders on which the first AWG is operated need not match the first and second orders on which the second AWG is operated. The different technology parameters may include different materials, different waveguide dispersions, and different sums of material and waveguide dispersion.

In one configuration the transmission path includes two optical fibers, one carrying the first optical energy and the other carrying the second optical energy.

In another configuration the transmission path has only a single optical fiber. The system in this configuration further includes a first WDM filter/combiner having two inputs in optical communication with respectively the first and second outputs of the first AWG and an output in communication with a first end of the single optical fiber, and a second WDM filter/combiner having one input in communication with a second end of the single optical fiber and two outputs in optical communication with respectively the first and second inputs of the second AWG.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 1 is a table of a portion of the ITU Grid Specification.

FIG. 2 is a table illustrating channel plans of two different AWGs made with different technology parameters.

FIG. 9 is a table showing a channel plan that matches the ITU-plan, within a few GHz, for both the C-band and the L-band.

FIG. 10 is a table showing a red-blue channel plan which is very close to the ITU grid for both the red band and the blue band.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 3:
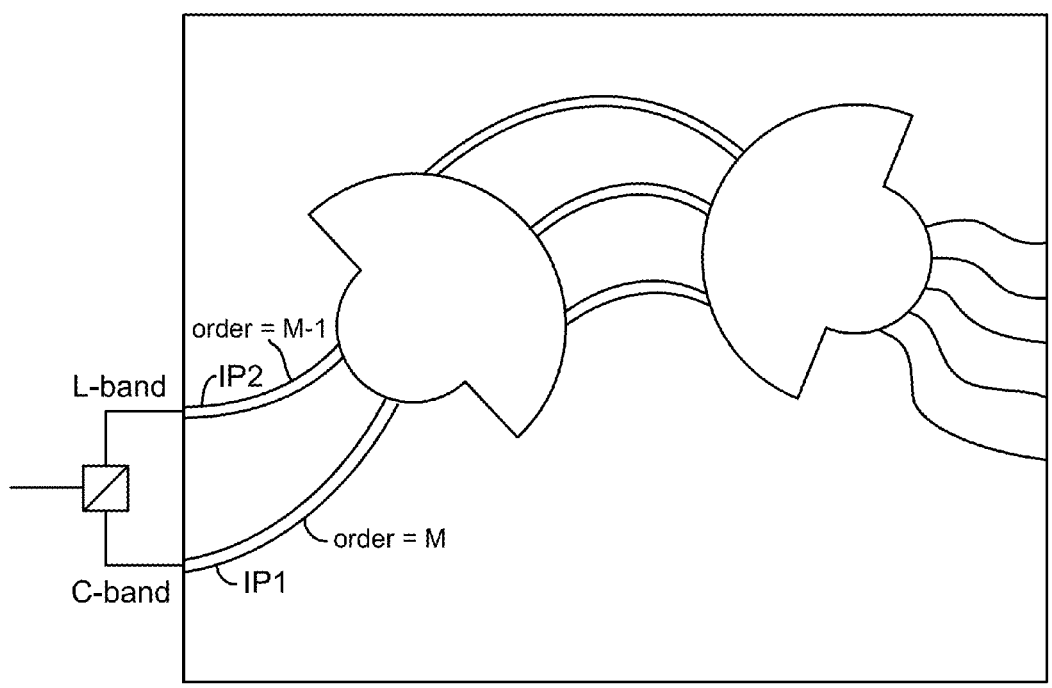
FIGS. 3, 6 and 7 illustrate AWGs incorporating features of the invention.

The present technology addresses the above limitations, in one or more improvements, separately or together. It allows an AWG to be designed using any set of technology parameters which will multiplex or demultiplex channels in two or more frequency bands or sub-bands simultaneously, having virtually any desired frequency spacing between the bands or sub-bands, and virtually any desired channel spacing inside each of the bands or sub-bands. For example, it allows definition of a channel plan on two different bands simultaneously with almost identical channel spacing in one band as in the other. It also allows design of an AWG with arbitrary separation between two frequency bands simultaneously. In practice it is often desired to have all the frequencies to be multiples of 50 GHz, thereby maintaining compatibility with the existing ITU grid. Roughly described, the present technology achieves this using a dual input AWG as shown in FIG. 3, instead of a single input AWG. Other embodiments have multiple inputs of three or more.

One of the inputs is used for one band of frequencies, say the C-band, and the other input carries the other band of frequencies, say the L-band. In another example, an AWG is designed which operates in the blue and red sub-bands of the C-band respectively. The sub bands can be defined arbitrarily. Although the industry has not yet decided what bands of frequencies will be used for WDM-PON, the technology disclosed herein is applicable to any combination of sub-bands from any combination of bands. For example it could be S-band and C-band, or C-band and L-band or any sub-band of C-band and any sub-band of L-band. The ITU standard, the frequencies being multiples of 50 GHz, is currently used in DWDM telecom systems. It is expected to use those same frequencies in any future telecom architectures, like WDM-PON, as well. This is because it enables the use of existing components. However, in other embodiments, the present technology is applicable to multiples other than 50 GHz, higher than 50 GHZ or lower than 50 GHz.

Prior art instances of dual input cyclic AWGs operate on one sub-band at a time, because they were developed as an inventory reduction alternative to single input cyclic AWG. These AWGs can operate with one selectable sub-band at a time, but not multiple sub-bands simultaneously. The reason for this limitation with prior art AWGs, is that only one sub-band at a time is required to maintain compatibility with the telecom system which uses the single input AWG. Problems with ITU wavelength error are acknowledged but remain unresolved, such as in U.S. Pat. No. 6,608,948. In such designs techniques such as different temperature set point, stressing devices, and moving input position are used to shift the center frequency depending on the frequency band for which it is to be deployed. In the case of a dual input AWG these techniques shift the center frequency of both inputs simultaneously, so if they are adjusted to provide correct channel spacing or center frequency for one band, they would not be accurate for the other band.

Indeed, the approach described herein can be extended to more than two inputs for more than two frequency bands. But in current applications, like WDM-PON two bands of frequencies is most relevant.

As will be shown mathematically in a later section, an angular displacement of the input will shift the frequency of the L-band or red frequencies relative to the C-band or blue frequencies. The displacement is angular. Hence, this shift of the input allows one to freely design the frequency separation between the two bands. On top of that, and more importantly, it is known that the displacement of the input also modifies the channel-spacing. The combined change of channel spacing, a decrease due to operation in a lower order for the L-band or red frequencies, and an increase or decrease in channel spacing due to the displacement of the input, results in almost any arbitrary channel spacing, as desired.

There are three design parameters which can be chosen more or less freely: the order of the frequency band of input 1, the order of the frequency band of input 2, and the angular displacement of input 2 relative to input 1. Apart from the restriction that the order is an integer, this allows the designer to achieve both correct frequency separation of bands AND correct channel spacing.

It is possible to achieve correct channel spacing and almost exact frequency separation (<±2 GHz difference for practical purpose for AWG working with one band in C band and another in L-band) or it is possible to achieve correct frequency separation and almost exact channel spacing. (better than 0.2% for AWG working with one band in C band and another in L-band) or any combination, such as both nearly exact frequency separation and nearly exact channel spacing.

Figure 7:
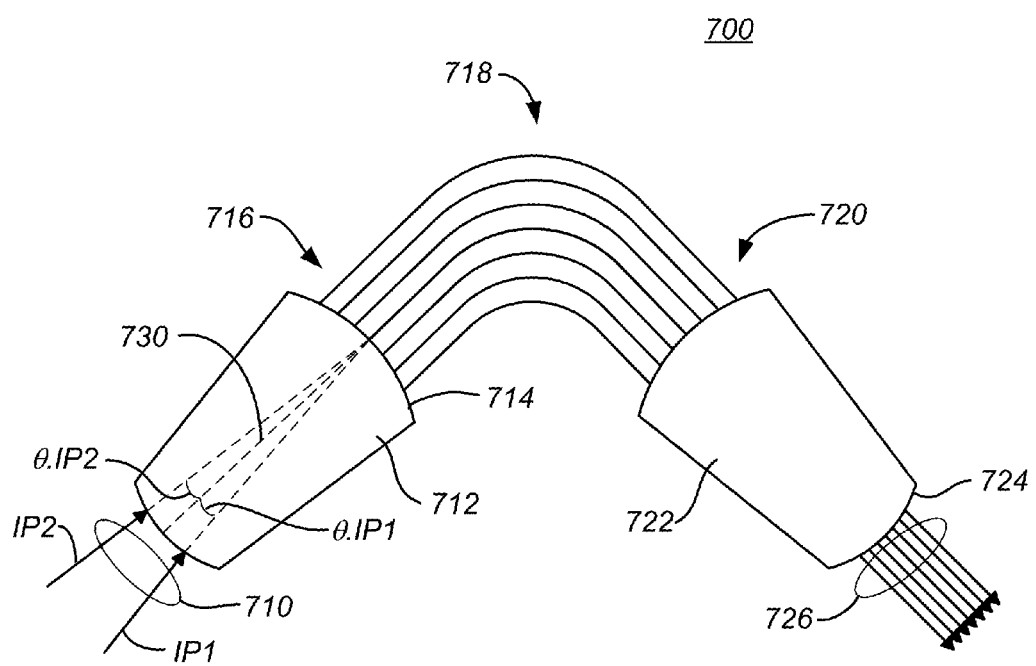

FIG. 7 illustrates an AWG incorporating features of the invention. It comprises a substrate ("die", "chip") 700 supporting two or more input optical waveguides 710 delivering optical energy into an "input slab" region 712. Two specific inputs IP1 and IP2 are shown. The slab region 712 is a planar waveguide which confines the input optical energy in only the vertical dimension; the energy is permitted to spread transversely without restriction. The input slab is sometimes referred to herein as an "input free space region", or an "input free propagation region". Note that despite the implication of these terms, energy spreads freely in these regions only in the transverse dimension; it remains confined vertically.

A far field image of the input optical energy for each of the inputs is developed on the far boundary 714 of the input free space region 712. At this boundary the light enters the input end 716 of a waveguide array 718 which consists of tens or hundreds of individual waveguides. The array waveguides are of lengths which increase linearly across the array, each waveguide having a length which differs from its nearest adjacent waveguide by a value ΔL.

Optical energy exits the waveguide array 716 at an output end 720 thereof, and delivers the light into an "output slab" region 722. Like the input slab, the output slab region is a planar waveguide which confines the input optical energy in only the vertical dimension. The energy is permitted to spread transversely without restriction, and for that reason the output slab is sometimes referred to herein as an "output free space region", or an "output free propagation region". In some embodiments the input and output free space regions overlap each other such that the input and output beams cross each other. Note that it is assumed herein that the input and output free-space region have identical refractive index. The formulas set forth herein can be easily modified accordingly if this is not the case in a particular embodiment.

A diffraction pattern is developed on the far boundary 724 of the output free space region 722, where the light enters a set of one or more output optical waveguides 726. Considering one of the input waveguides 710, for example IP1, the structure can be used as a demultiplexer for WDM signals carried on IP1. Thus information can be carried on multiple channels (wavelengths) in IP1 and the channels are separated out by the AWG for delivery into the different output waveguides 726. The structure can also be used as a multiplexer if operated in reverse.

Because of the bidirectional nature of the optical components described herein, as used herein, the terms "input" and "output" are used only to distinguish between the two ends of the device, and not to indicate which direction the light travels. That is, a particular device might include two ports A and B. If used in one way, light may travel from port A to port B whereas if operated in reverse, light may travel from port B to port A. As used herein, port A may be called the "input" and port B the "output", but this does not preclude operating the device in such a way that light travels from port B to port A. In fact in many embodiments herein, light travels in both directions simultaneously. Thus description herein describes the structure of the device, which does not change if operated with light traveling in the opposite direction.

It will be appreciated that while the free space regions are often though of as having structural features to mark their boundaries, in fact in many cases structural features are unnecessary; the waveguides of the waveguide array 718 and the output waveguides input or output waveguides 710 or 726 can merely terminate at positions corresponding to the arcs that are shown in FIG. 7 as forming the boundaries of the free space regions 712 and 722 respectively. The arcs on which they terminate are referred to herein as "boundaries", whether or not the arc is manifested as an arc physically in the device. Also note that whereas the upstream and downstream boundaries of the free-space regions are shown in FIG. 7 as having an arc shape, an arc shape is not required in all embodiments.

As mentioned, optical energy provided on one of the inputs IP1 carrying signals on multiple wavelengths, are separated out by the AWG for delivery into the different output waveguides 726. The well-known grating equation is typically used to determine where to position the receivers for the output waveguides 726. The grating equation gives the positions of the receivers as angular offsets from the array centerline in the output free space region 722, and they depend on technology parameters of the device (such as the pitch $d_a$ of the array 718 waveguides where they meet the free space regions, and the effective indices of refraction of the free space regions and the array waveguides (both of which depend on the channel frequency)), the path length increment ΔL between adjacent waveguides in the array 718, the order M at which the AWG is operated, and the frequency of the particular channel which is to be captured by each receiver.

But it is desirable to be able to operate the AWG using channels in two different bands, either traveling in the same direction or in opposite directions, such that each output waveguide 726 carries two channels: one in each band. Because of the dependency on frequency, though, it can be seen that if the input waveguide IP1 were to also carry channels in a second band on the same order M, the channels would not appear at the same angular positions as required for the channels of the first band. It may be possible to operate the second band on a different order, but in order to match the angular positions appropriate for the first band, as explained previously the channel plan of the second band will not be as desired. In particular the second band would have a disadvantageous frequency spacing.

Figure 14:
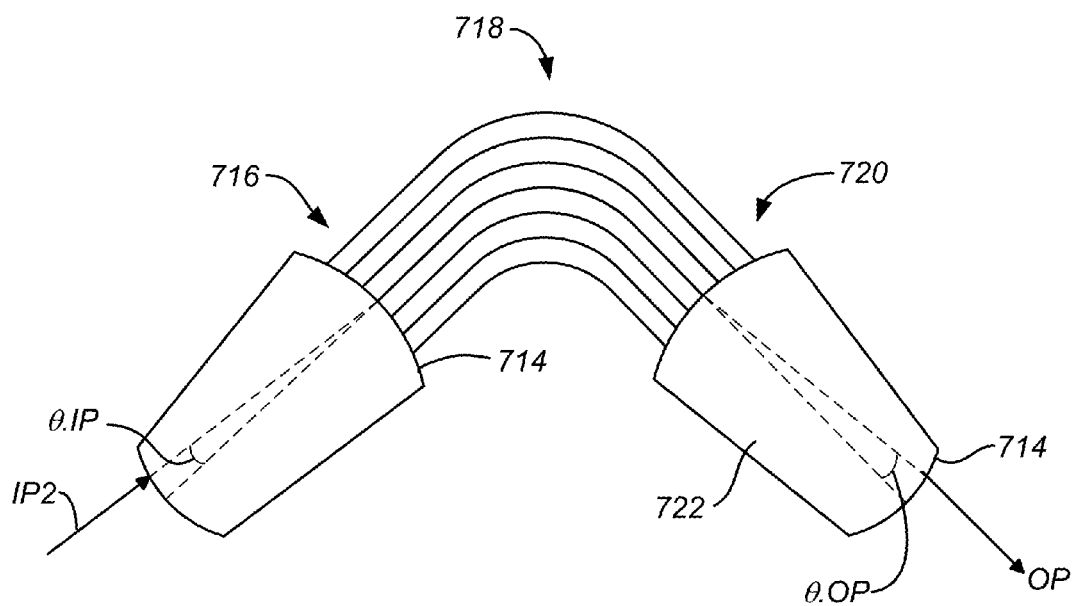
FIG. 14 is a drawing which defines angle conventions for an AWG.

In order to overcome this problem, the AWG of FIG. 7 includes a second input IP2 on which the second band of frequencies can be carried. As derived mathematically below, the first and second inputs are disposed across the input free-space region from the array at angles $\theta_{IP1}$ and $\theta_{IP2}$ measured relative to where the array centerline meets the input free-space region 712. As used herein, within the waveguide array 718 of an AWG, the "array centerline" curves with the waveguide array itself, but is considered to continue in straight lines both upstream and downstream of the array 718. The straight lines are the tangents to the array centerline where the array terminates. Since the array 718 is curved, the array centerline upstream of the array is not usually in-line with the array centerline downstream of the array. In FIG. 7, the array centerline, as it extends into the input slab region 712, is designated 730. For purposes of the present description, input and output angles $\theta_{IP}$ and $\theta_{OP}$ are defined with the conventions shown in FIG. 14.

If $v_1$ is the desired center frequency of the IP1 frequency band and $v_2$ is the desired center frequency of the IP2 frequency band, then the two input waveguides IP1 and IP2 are disposed at angles $\theta_{IP1}$ and $\theta_{IP2}$ measured relative to the array centerline, where $\theta_{IP1}$ and $\theta_{IP2}$ satisfy $$\frac{M_2}{v_2 N_2} - \frac{M_1}{v_1 N_1} = \frac{d_a}{c}\left(\frac{N_{s2}}{N_2}\sin\theta_{IP2} - \frac{N_{s1}}{N_1}\sin\theta_{IP1}\right),$$

where $d_a$ is a pitch of the array waveguides where they meet the input free space region, c is the speed of light in a vacuum, $N_{s1}$ is the effective index of refraction in the input free space region at frequency $v_1$, $N_{s2}$ is the effective index of refraction in the input free space region at frequency $v_2$, $M_1$ is the order on which input IP1 operates, and $M_2$ is the order on which input IP2 operates. $N_1$ is the effective index of refraction of a waveguide in the waveguide array at frequency $v_1$, and $N_2$ is the effective index of refraction of a waveguide in the waveguide array at frequency $v_2$.

Furthermore, the ratio of channel spacings for the two bands, $\Delta(v_1 N_1)/\Delta(v_2 N_2)$, satisfies $$\frac{v_2 N_2 - v_1 N_1}{v_1 N_1} = \frac{\Delta(v_2 N_2)}{\kappa \Delta(v_1 N_1)} + \left(1 - \frac{1}{\kappa}\right)\frac{M_2}{M_1} - 1$$

with $$\kappa = 2\left(1 + \frac{M_1}{M_2}\frac{v_2 N_2 - v_1 N_1}{v_1 N_1} + \frac{M_1 - M_2}{M_2}\right).$$

Using the above equations and the grating equation, it is possible to select values for $\theta_{IP1}$, $\theta_{IP2}$, $M_1$, and $M_2$, such that input IP1 carries frequencies in a first band having virtually any desired center frequency $v_1$ and channel spacing $\Delta(v_1 N_1)$, and input IP2 carries frequencies in a second band having virtually any other desired center frequency $v_2$ and any channel spacing $\Delta(v_2 N_2)$, and the resulting channel plans will appear coincidently on a single plurality of output receivers for output waveguides 726. The only significant limitation in the precision with which the resulting center frequencies and channel spacings will exactly match desired values is the requirement that the orders be integers.

C-band-L-band WDM-PON Example

As an example, FIG. 9 is a table showing a channel plan that matches the ITU-plan, within a few GHz, for both the C-band and the L-band. This channel plan is made for the high contrast technology described above, 1.5% index-contrast between core and cladding, but one could make a channel plan equally close to the ITU grid using the low contrast glass technology described above, with 0.7% index contrast. The angle of input IP1 is −0.0525485 radian and the angle for input IP2 is 0.0525485 radian. It is noted that input IP1 carries the C-band frequencies which correspond to order $M_1$=20 for this AWG. Input IP2 for the L-band frequencies operates on order $M_2$=19. These orders are smaller than for many conventional WDM-PON AWGs, e.g. of the table in FIG. 2, which operates on orders 38 and 37 respectively. This lower order results in a larger AWG-chip, which is a slight drawback, but also in a larger spectral coverage which is an advantage.

Blue-Red WDM-PON Example

A red-blue channel plan which is within a few GHz (<±2 GHz) on the ITU grid for both the red band and the blue band can be achieved as shown in the table of FIG. 10. The design is made for an AWG which operates on order 40 for input IP1, the blue band, and on order 39 for input IP2, the red band. This design is made for a technology where the index-contrast between the 4×4 um glass core and the cladding is 1.5%. For this technology and type of waveguide, the dispersion in the array waveguide in the telecom window is $$\frac{dN}{d\lambda} = -0.02 \mu m^{-1}.$$

Figure 8:
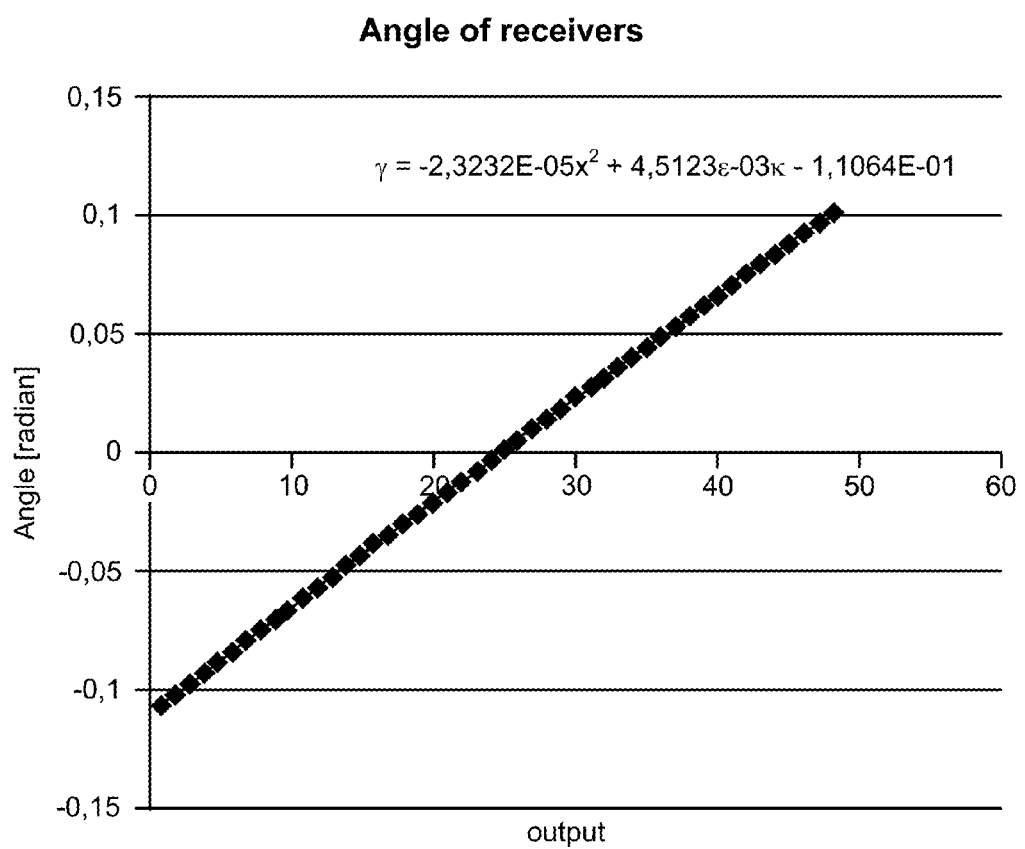
FIG. 8 sets forth angles of outputs of an AWG.

For 1.55 μm wavelength, the effective index of the waveguide in the AWG-array section is 1.4568, and the effective index in the slab is 1.4624. The pitch of the array 718 waveguides at the slab-array transition is $d_a$=5 μm, and the length increment in the AWG is $\Delta L$=41.88 μm. The angle of input IP1 is −0.05298 radian and the angle of input IP2 is 0.05298 radian. The angles of the outputs are shown in FIG. 8.

Figure 5:
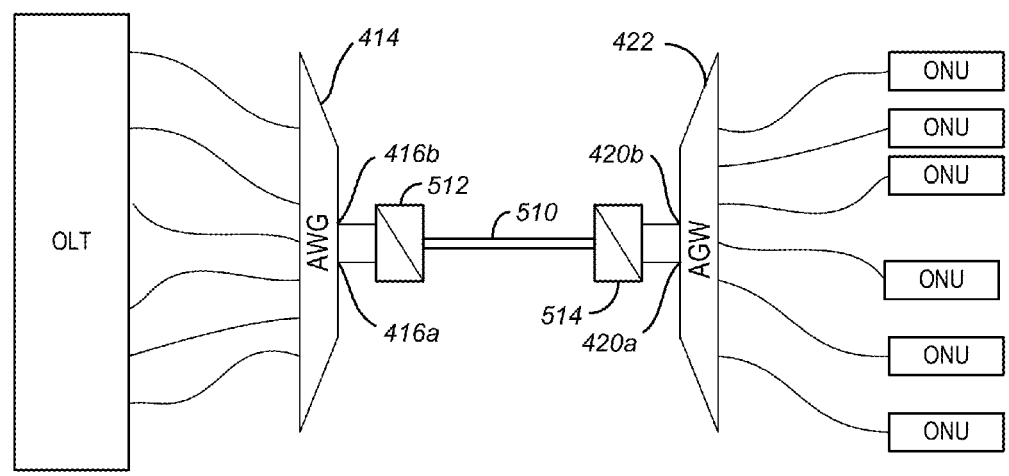

It is noted that the channel plans for input IP1 and input IP2 overlap. This allows the use of many more channels than would be possible with a single input AWG. In the configuration of FIG. 5, described below, one would use a band-filter, a so called red-blue filter, to multiplex and de-multiplex the two frequency bands for carrying by a single fiber. In that case one would no longer use the channels in one band that overlap in the frequency domain with channels in the other band. For example one might use only 24 output channels, outputs 13-36 to have a red-band that goes from 191.7 THz to 194.0 THz and a blue band that goes from 194.1 THz to 196.4 THz. But the same dual AWG can equally be split differently, e.g. 191.6 THZ to 193.9 THz for the red C-band and 194.0 THz to 196.3 THz for the blue C-band.

Figure 6:
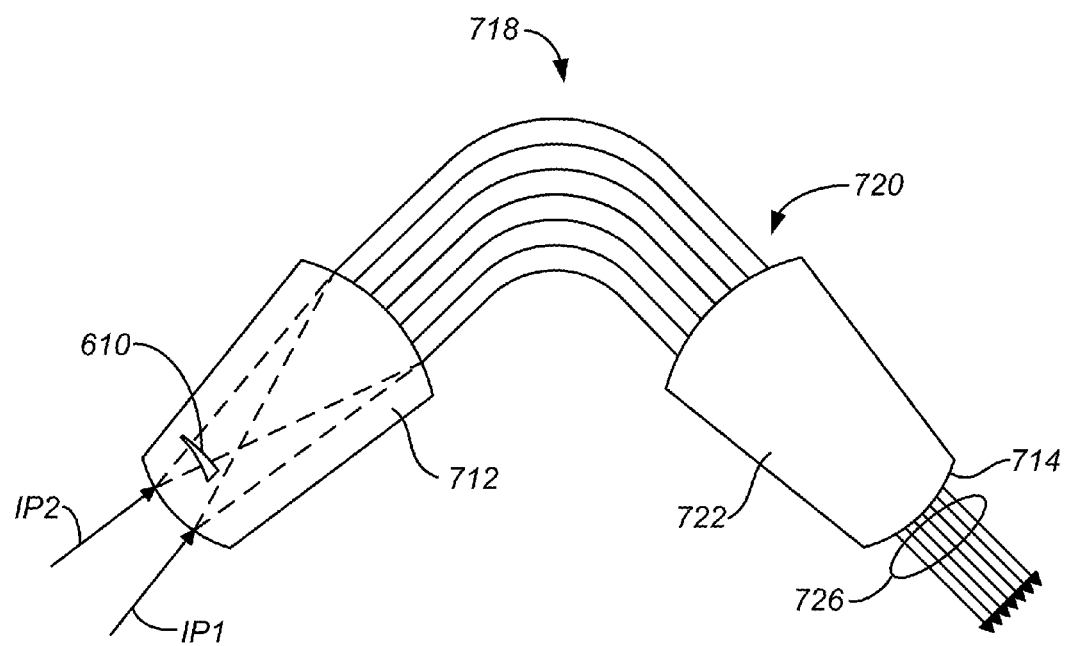

In each of the above two examples, one for C-band and L-band and the other for Blue and Red bands, the angles of the two inputs are not centered about zero. This is not a requirement in all embodiments. Due to technology variation, it could occur that the separation between the two bands, the blue and red band, is not exactly a multiple of 100 GHz, in which case one could empirically correct for this by angularly shifting one input relative to the other. Such a correction could also be achieved by UV or heat trimming, that is creating a high or low index region in the shape of a triangle or other geometries. One example configuration of a different index region is given in FIG. 6, where a high index region 610 has been inserted in only the optical paths for input IP2. Alternatively or additionally, the dual input AWG can be athermalised by any of the same techniques as for single input AAWG. See for example the above-incorporated U.S. Pat. No. 7,397,986.

Figure 4:
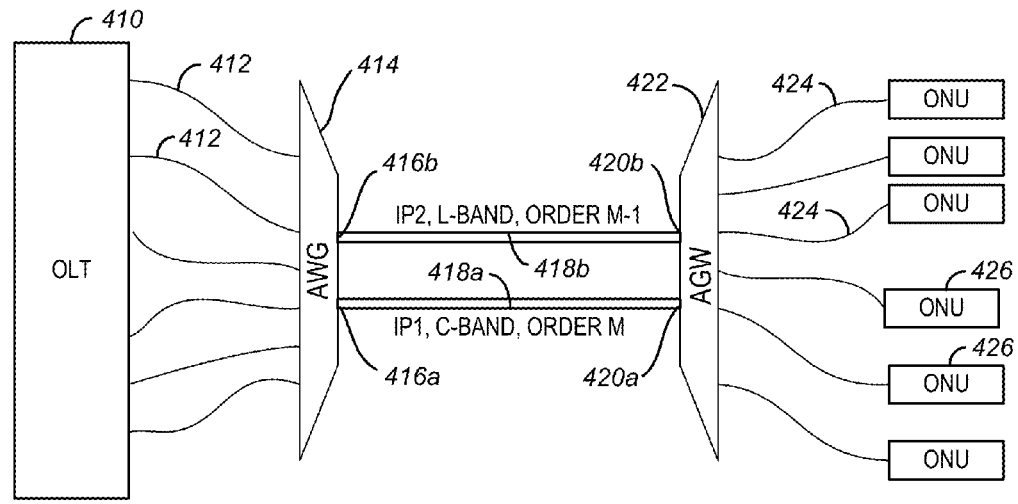
FIGS. 4 and 5 illustrate systems having AWGs incorporating aspects of the invention on both ends of a transmission path.

FIGS. 4 and 5 illustrate systems having AWGs incorporating aspects of the invention on both ends of a transmission line. Referring to FIG. 4, an OLT (Optical Line Terminal) 410 has multiple outputs 412 each carrying two channels, one in one band (for example the C-band) and one in a second band (for example the L-band). The OLT outputs 412 are connected by fiber to an AWG 414 in multiplexer configuration, such that there are multiple inputs and two outputs 416a and 416b. For output 416a, the AWG 414 operates on order M and output 416a carries all the C-band channels from all the OLT 410 outputs 412. For output 416b, the AWG operates on a different order, in this illustration order M−1, and output 416b carries all the L-band channels from all the OLT 410 outputs 412. All the signals are carried on a transmission path consisting of two separate fibers 418a and 418b to two corresponding inputs 420a and 420b of another two-input AWG 422 in the field in a demultiplexer configuration. AWG 422 has multiple outputs 424, corresponding to the multiple outputs 412 of the OLT 410, and these are connected by fiber to respective ONUs (optical network units) 426 near the end users. Each fiber 424 carries two channels, one in the C-band and one in the L-band. Typically, one of these channels are used for upstream traffic while the other channel is used for downstream traffic. The two can operate simultaneously.

FIG. 5 is the same as FIG. 4, except that the transmission path which consisted in FIG. 4 of two fibers 418a and 418b, has been replaced by a transmission path that consists of a single fiber 510, connected at one end to AWG 414 via a WDM filter/combiner 512, and connected at the other end to AWG 422 via another WDM filter/combiner 514. The WDM filter/combiner 512 combines the C-band channels on AWG 414 output 416a with the L-band channels on AWG 414 output 416b, onto the single fiber 510. The WDM filter/combiner 514 splits the two bands from fiber 510, communicating the C-band channels to input 420a of AWG 422 and communicating the L-band channels to input 420b of AWG 422.

In the configuration of FIG. 4, one does not require a WDM band filter, to separate the frequency bands for the two inputs on the AWG at the ONU side. Nor for the two outputs when this dual AWG is operated in reverse, i.e. as a multiplexer on the OLT side of a WDM-PON network. In that situation, one uses two fibers, one fiber for each input/frequency band, for example using one input/band for upstream and another for downstream traffic. The channel plans of the two frequency bands can partially overlap and depending on further system requirements, one could use the overlapping frequencies, to increase capacity in the system. The configuration of FIG. 5, on the other hand, requires only a single fiber in the transmission path.

Mathematical Background

The grating equation: For an AWG, the following relation holds $$d_a N_s(\lambda)(\sin\theta_{input} + \sin\theta_{output}) + N_a(\lambda)\Delta L = M\lambda$$

with $\theta_{input}$ the angle of the input beam, $\theta_{output}$ the angle of the output beam, $\Delta L$ the array length increment, $d_a$ the array pitch at the slab-array transition, $\lambda$ the wavelength, and M an integer which defines the order in which AWG operates. $N_a$ is the effective index of an array waveguide and $N_s$ is the effective index of the slab. $N_a$ is sometimes written herein merely as N.

The central wavelength $\lambda_c$, or central frequency $v_c$ for that matter, is a property of the array section, and corresponds to the frequency for which M times the wavelength exactly makes up the path difference. I.e. it is the frequency, for a given order M, where the angle of the input and output beam are exactly equal, but of opposite sign.

$$\theta(\lambda_c) = -\theta_{input} \Rightarrow \lambda_c = \frac{\Delta L N(\lambda_c)}{M} \Rightarrow v_c = \frac{c}{\lambda_c}$$

with c the constant speed of light.

The free spectral range, FSR, can be calculated from the grating equation and is given by:

$$FSR = \alpha \frac{v_c}{M} \text{ with } \alpha = \frac{1}{1 - \frac{dN}{d\lambda}\frac{\lambda}{N}}.$$

The free spectral range defines the repetition rate of the spectral response in the frequency domain. Note that for any cyclic AWG, the FSR varies for the different outputs. In the above equation FSR is defined here for the output which has equal but opposite angle as the input waveguide. Also note that the FSR depends on the material and waveguide dispersion $$\frac{dN}{d\lambda}$$

or $\alpha$. In the telecom C-band $\alpha$ is 0.9793 for the 1.5% contrast 4×4 um technology and $\alpha$ equals 0.984 for the 0.7% contrast 6×6 um Silica on Silicon technology.

The deflection of the focal spot of the array output as a function of frequency is given by:

$$\theta_{output}(v) = \arcsin\left(\frac{\Delta L}{d_a}\frac{N(v)}{N_s(v)}\left(1 - \frac{v_c N(v_c)}{v N(v)}\right) - \sin(\theta_{input})\right).$$

Using the above equations, one can engineer arbitrary channel plan for both bands of frequencies.

In the two example designs set forth above, one for L-band and C-band, and one for red and blue bands of frequencies, the AWG is designed such that two bands of frequencies are mixed on the output side, both of which can be made to match the ITU grid. This is achieved by using two inputs, each of which addresses one band and where each frequency band corresponds to a different order. These channel plans are impossible to achieve with a conventional cyclic AWG using only a single input. It is noted that the above can be extended beyond two bands, by using more than 2 inputs and more than 2 orders.

Note that the order of an AWG addressed by each of the inputs is a physical characteristic of the device. It can be determined from an AWG by performing a frequency scan of the device, or by calculation given the technology parameters of the device and the path length increment between adjacent waveguides in the array.

Further Mathematical Analysis

It is desired to derive design formulas for creating arbitrary relative channel spacing for two inputs of an AWG as well as arbitrary frequency offset between the two inputs.

Rewriting the grating equation in terms of frequency rather than wavelength one obtains:

$$d_a \frac{N_s(v)}{N(v)}(\sin\theta_{input} + \sin\theta_{output}) + \Delta L = \frac{Mc}{N(v)v}$$

with c the speed of light and v the frequency of light. For most practical purpose it can be assumed that the ratio of the slab index to the array index is constant for the frequency range of interest. This further simplifies the grating equation to $$d_a \frac{N_s}{N}(\sin\theta_{input} + \sin\theta_{output}) + \Delta L = \frac{Mc}{N(v)v}$$

From the above grating equation it can be concluded that for each combination of input and output one has the following invariant.

$$\frac{M}{N(v)v} = const$$

This holds for each integer M, so, for example it follows that for input 1 and for any given output the following relation between frequencies of different orders $M_1$, $M_2$ holds.

$$M_1 v_1^{M2} N_1^{M2} = M_2 v_1^{M1} N_1^{M1} \qquad \text{(eq. 1)}$$

where $M_1$ is one integer order, and $M_2$ another. For a given output, $v_1^{M2}$ is the frequency from input 1 operating on order $M_2$, and $v_1^{M1}$ and is the frequency from input 1 operating on order $M_1$, $N_1^{M2}$ is the array index at frequency $v_1^{M2}$ and $N_1^{M1}$ is the array index at frequency $v_1^{M1}$. [In the following, whenever the superscript is missing it is assumed that order $M_1$ is meant for input 1 and order $M_2$ is meant for input 2.]

From this, the increment $\Delta(vN)$ of $vN$ between adjacent receiver waveguides is proportional to the order of the AWG.

$$M_1 \Delta(v_1^{M2} N_1^{M2}) = M_2 \Delta(vN_1) \qquad \text{(eq. 2)}$$

The above equations describe how, for a given input and output, frequency and frequency spacing of an AWG alters by changing the order from $M_1$ to $M_2$. It is clear that frequency and frequency spacing change by the same relative magnitude. As stated before this is undesired and we want to be able to modify frequency and frequency spacing independently. For this purpose we create a second input, operating on order $M_2$, which has input angle $\theta_{IP2}$. Any more inputs can be created of course.

From the grating equation it follows that, for any given output angle, $$\frac{M_2}{v_2 N_2} - \frac{M_1}{v_1 N_1} = \frac{d_a}{c}\left(\frac{N_{s2}}{N_2}\sin\theta_{IP2} - \frac{N_{s1}}{N_1}\sin\theta_{IP1}\right)$$

Shifting the input, changes the frequency but also changes the frequency spacing between adjacent receivers. For the situation where both inputs operate on the same order, $M_1 = M_2$ it can be calculated to be described by the following equation $$\frac{\Delta(v_2 N_2) - \Delta(v_1^{M2} N_1^{M2})}{\Delta(v_1^{M2} N_1^{M2})} = \qquad \text{(eq. 3)}$$

$$2\frac{v_2 N_2 - v_1^{M2} N_1^{M2}}{v_1^{M2} N_1^{M2}} + \left(\frac{v_2 N_2 - v_1^{M2} N_1^{M2}}{v_1^{M2} N_1^{M2}}\right)^2 \Leftrightarrow$$

$$\frac{\Delta(v_2 N_2) - \Delta(v_1^{M2} N_1^{M2})}{\Delta(v_1^{M2} N_1^{M2})} = \kappa \frac{v_2 N_2 - v_1^{M2} N_1^{M2}}{v_1^{M2} N_1^{M2}}$$

$$\text{with } \kappa = 2\left(1 + \frac{v_2 N_2 - v_1^{M2} N_1^{M2}}{2 v_1^{M2} N_1^{M2}}\right)$$

Using eq. 1 and eq. 3, the total change in frequency spacing for input IP2 operating on order $M_2$ relative to input 1 operating on order $M_1$ is given by:

$$\frac{\Delta(v_2 N_2)}{\Delta(v_1 N_1)} = \frac{M_2}{M_1}\left(1 + \kappa \frac{v_2 N_2 - v_1 N_1}{v_1 N_1}\right) \Leftrightarrow$$

which, using eq. 2, can be expressed as $$\frac{v_2 N_2 - v_1 N_1}{v_1 N_1} = \frac{\Delta(v_2 N_2)}{\kappa \Delta(v_1 N_1)} + (1 - 1/\kappa)\frac{M_2}{M_1} - 1 \qquad \text{(eq. 4)}$$

with $$\kappa = 2\left(1 + \frac{M_1}{M_2}\frac{v_2 N_2 - v_1 N_1}{v_1 N_1} + \frac{M_1 - M_2}{M_2}\right)$$

This equation, eq. 4, is sometimes referred to herein as the model equation.

EXAMPLES

Using the above equation one can now readily calculate the frequency separation between the two inputs as a function of the relative channel spacing, $M_1$, $M_2$ and the frequency of input IP1 for a given output. For demonstration purposes it is assumed that the index N is independent of frequency and taking $\kappa=2$, neglecting the quadratic terms in relative frequency change, the equation reduces to:

$$\frac{v_2 - v_1}{v_1} = \frac{\Delta v_2}{2\Delta v_1} + \frac{M_2}{2M_1} - 1$$

Figure 11:
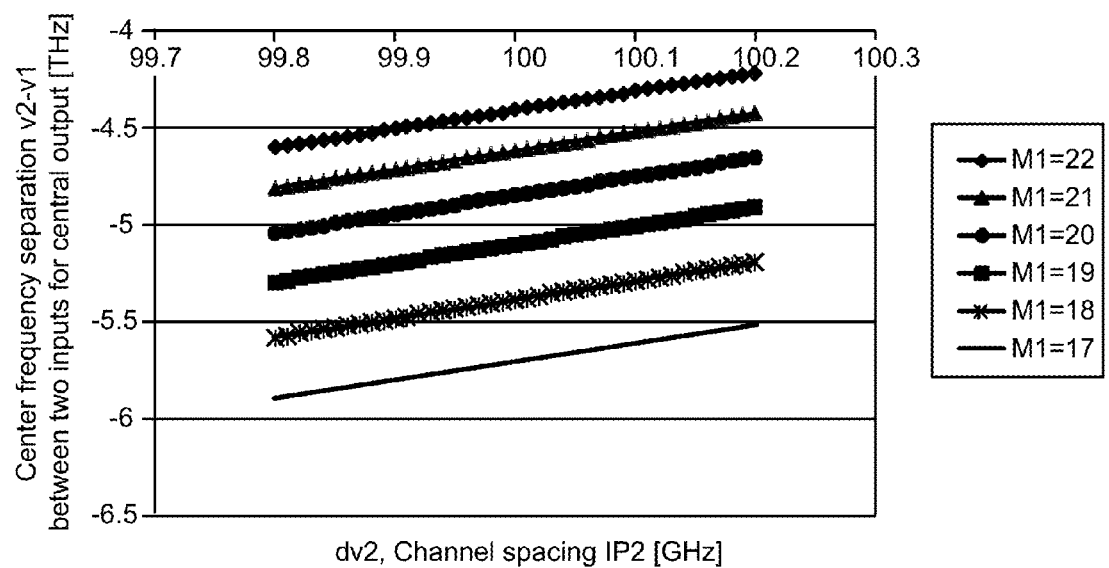
FIGS. 11-13 are charts illustrating results that can be achieved using aspects of the invention.

Taking $\Delta v_1$ equal to 100 GHz, $v_1 = 194.0$ THz, it is shown in FIG. 11 how for various orders $M_1$, $M_2 = M_1 - 1$, the channel spacing of input 2 is also very close to 100 GHz, within the range 99.8 to 100.2 GHz as desired. This holds for a wide range of frequency separations between the two inputs.

Figure 12:
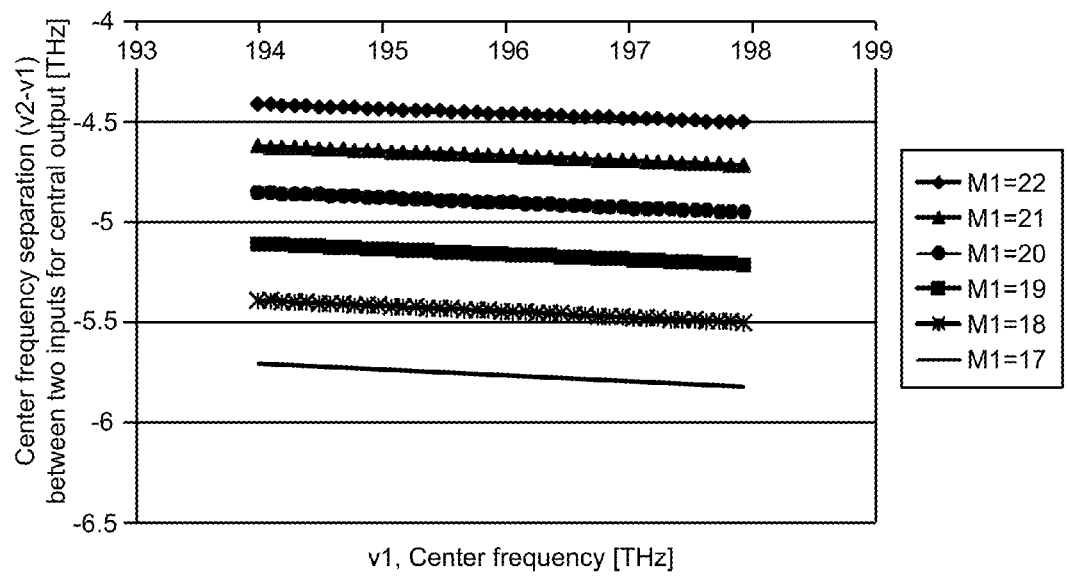

In FIG. 12, the channel spacing for both inputs is kept exactly $\Delta v_1 = \Delta v_2 = 100.0$ GHz and it is shown again how arbitrary frequency separation between the two inputs can be achieved, now by simply varying the frequency $v_1$ of input 1 and the output under consideration.

Figure 13:
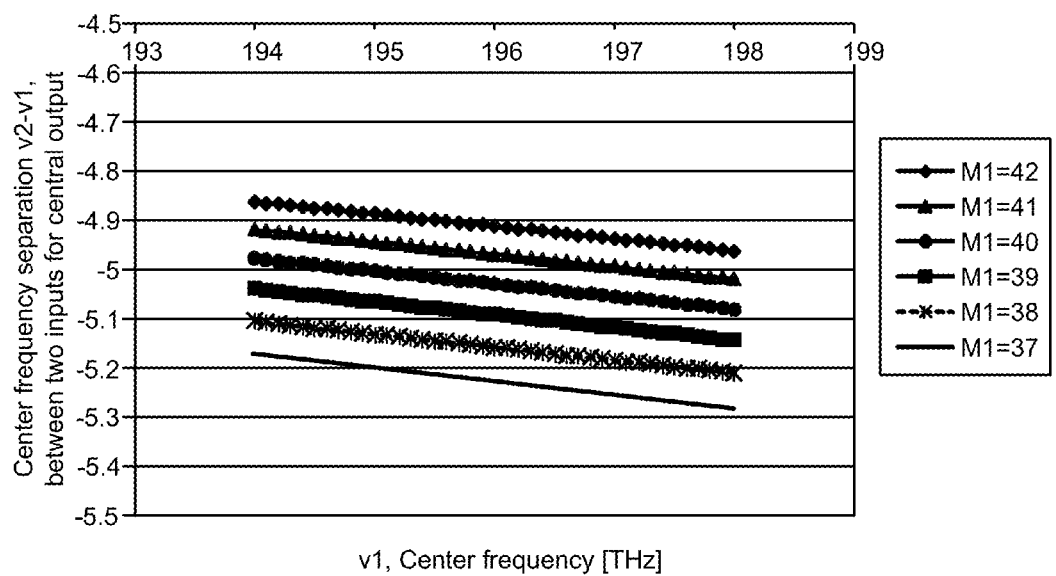

The dual input AWG techniques described herein need not be used only for implementing the ITU grid frequencies. In order to demonstrate this, FIG. 13 reproduces the technology specific channel plans mentioned earlier and as shown in the table of FIG. 2. Here an arbitrary frequency separation can be created with channel spacing of $\Delta v_1 = 100$ GHz for input 1, and $\Delta v_2 = 97.37$ GHz for input 2.

The above examples are calculated for a situation with zero waveguide and material dispersion, $\alpha = 1.0$. However, arbitrary channel plans can be achieved also in the presence of waveguide and material dispersion. Using this approach, having multiple inputs operating on different order, allows one to make channel plans agnostic to the technology parameters in which the AWGs are fabricated.

Another benefit of the multi-input AWGs here described over a single input cyclic AWG is that the two inputs can each have empirical corrections. For example by UV-writing prisms in the path of each beam (triangular regions of different index) or moving one input relative to the other(s) by other means.

The model equation gives solutions for $M_1$ and $M_2$, $v_1$ and $v_2$, etc. In order to calculate the input and output angles one should use the grating equation, or deflection equation for each of the inputs $$\theta(v) = \arcsin\left(\frac{\Delta L}{d_a}\frac{N(v)}{N_s(v)}\left(1 - \frac{v_c N(v_c)}{v N(v)}\right) - \sin(\theta_{input})\right),$$

where it should be noted that $v_c$ itself depends on the grating order, $M_1$ for input 1, and $M_2$ for input 2, and so on for cases of more than 2 inputs.

A typical design process, knowing the various indices of refraction and desired center frequencies and channel spacings for each of the inputs, might proceed as follows.

First, using eq. 4 (or a simplification thereof), select orders M1 and M2=M1−1 that best satisfy the desired values. This may be most easily accomplished by preparing charts such as FIGS. 11 and 12, and selecting the orders whose plot best satisfies the desired values. Some tradeoffs may be necessary in the precision of either channel spacing or frequency spacing or both, as previously explained, but the resulting design can approximate the desired values very closely.

Next, select an input angle for IP1 and select any output angle, such as 0 radians. Given this information, together with the frequencies and the orders just selected, the grating equation is used to determine the length increment $\Delta L$ between adjacent waveguides in the array.

Next, now that the orders M1 and M2 and $\Delta L$ are known, the equation above relating $\sin \theta_{IP2}$ to $\sin \theta_{IP1}$ and $\Delta L$ is used to calculate the required angular spacing between the inputs.

Next, the grating equation is used to calculate the required angles for all the output receivers. This calculation can be done for either of the inputs since both should yield the same angles for the output receivers.

Finally, empirical adjustments can be made as previously described.

Accordingly, a technique has been described in which an AWG has at least first and second inputs, the first input being for carrying optical energy according to a first channel plan identifying a first center frequency and a first plurality of wavelength channels with a first constant channel spacing, and the second input being for carrying optical energy according to a second channel plan identifying a second center frequency and a second plurality of wavelength channels with a second constant channel spacing, the first and second center frequencies being different, wherein the first input is disposed such that optical energy according to the first channel plan provided on the first input will, using a first order $M_1$ of the waveguide array, image first, second and third adjacent channels of the first channel plan on the far boundary at respective angles $\theta_{OP1}$, $\theta_{OP2}$ and $\theta_{OP3}$ measured relative to where the array centerline meets the output free-space region, and wherein the second input is disposed such that optical energy according to the second channel plan provided on the second input will, using a second order $M_2$ of the waveguide array different from the first order $M_1$, image first, second and third adjacent channels of the second channel plan on the far boundary at substantially the respective angles, $\theta_{OP1}$, $\theta_{OP2}$ and $\theta_{OP3}$ each of the first, second and third channels in the second channel plan having a wavelength that differs from all of the first, second and third channels in the first channel plan.

Some Practical Considerations

It has already been mentioned that because the orders addressed by the inputs to the AWG must be integers, the equations and techniques described herein may not achieve desired channel plans and frequency separations exactly, though they can be made extremely close. Some examples described herein for example achieve a channel spacing which deviates by no more than 2 GHz from a desired 100 GHz channel spacing. If a device is made according to the equations and techniques described herein, it is still considered to achieve the desired channel plans and frequency separations "substantially".

Additionally, in a real device making use of the concepts described herein, it will be appreciated that it may be either impossible or commercially unnecessary to match the equations set forth above exactly. For example, the devices may deviate from the equations due to ordinary manufacturing tolerances. A real device which deviates from the equations set forth above for any of these reasons, is considered herein still to satisfy the equations "substantially". Since such devices still make use of the novel concepts taught herein they can be made with much better accuracy than conventional devices, even though they do not satisfy the equations exactly. Furthermore, whereas virtually any desired channel plan and frequency separation can be achieved using the equations and techniques described herein, it will be appreciated that an embodiment can still come closer to desired channel plans and frequency separations than can conventional devices and techniques, if the equations and techniques described herein are used with a small spoiling factor. Embodiments such as this are still considered herein to take advantage of the equations and techniques described herein and are therefore still considered to satisfy the equations "substantially".

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use

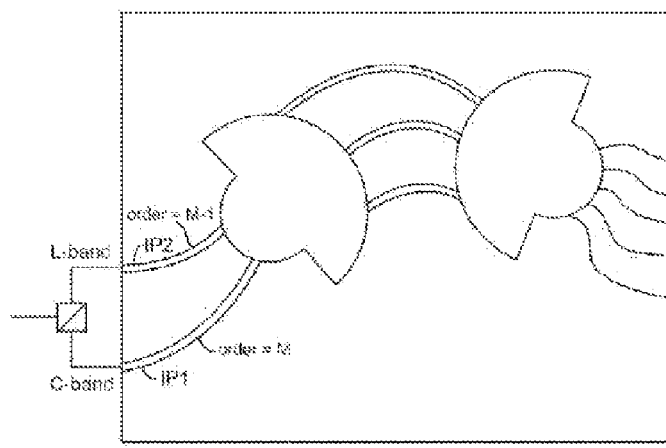

The invention claimed is:

1. Arrayed waveguide grating apparatus comprising an input free-space region, an output free-space region, and an array of waveguides from the input free-space region to the output free-space region, the output free space region having a far boundary disposed across the output free space region from the array,
wherein the input free-space region has an input port comprising at least first and second inputs, the first input being for carrying optical energy according to a first channel plan identifying a first center frequency and a first plurality of wavelength channels with a first constant channel spacing, and the second input being for carrying optical energy according to a second channel plan identifying a second center frequency and a second plurality of wavelength channels with a second constant channel spacing, the first and second center frequencies being different,
wherein the first input is disposed such that optical energy according to the first channel plan provided on the first input will, using a first order $M_1$ of the waveguide array, image first, second and third adjacent channels of the first channel plan on the far boundary at respective angles $\theta_{OP1}$, $\theta_{OP2}$ and $\theta_{OP3}$ measured relative to where the array centerline meets the output free-space region,
and wherein the second input is disposed such that optical energy according to the second channel plan provided on the second input will, using a second order $M_2$ of the waveguide array different from the first order $M_1$, image first, second and third adjacent channels of the second channel plan on the far boundary at substantially the respective angles $\theta_{OP1}$, $\theta_{OP2}$ and $\theta_{OP3}$, each of the first, second and third channels in the second channel plan having a wavelength that differs from all of the first, second and third channels in the first channel plan.

2. Apparatus according to claim 1, wherein the first and second inputs are disposed across the input free-space region from the array at angles $\theta_{IP1}$ and $\theta_{IP2}$ measured relative to where the array centerline meets the input free-space region,
where $\theta_{IP1}$ and $\theta_{IP2}$ substantially satisfy $$\frac{M_2}{v_2 N_2} - \frac{M_1}{v_1 N_1} = \frac{d_a}{c}\left(\frac{N_{s2}}{N_2}\sin\theta_{IP2} - \frac{N_{s1}}{N_1}\sin\theta_{IP1}\right),$$

where $v_1 N_1$ is the first center frequency, $\Delta(v_1 N_1)$ being the first channel spacing,
where $v_2 N_2$ is the second center frequency, $\Delta(v_2 N_2)$ being the second channel spacing,
where $d_a$ is a pitch of the array waveguides where they meet the input free space region,
where c is the speed of light in a vacuum,
and where $N_{s1}$ is the effective index of refraction in the input free space region at frequency $v_1$, $N_{s2}$ is the effective index of refraction in the input free space region at frequency $v_2$, $N_1$ is the effective index of refraction of a waveguide in the waveguide array at frequency $v_1$, $N_2$ is the effective index of refraction of a waveguide in the waveguide array at frequency $v_2$, and where $\Delta(v_1 N_1)/\Delta(v_2 N_2)$ substantially satisfies $$\frac{v_2 N_2 - v_1 N_1}{v_1 N_1} = \frac{\Delta(v_2 N_2)}{\kappa\Delta(v_1 N_1)} + \left(1 - \frac{1}{\kappa}\right)\frac{M_2}{M_1} - 1$$

with $\kappa = 2\left(1 + \frac{M_1}{M_2}\frac{v_2 N_2 - v_1 N_1}{v_1 N_1} + \frac{M_1 - M_2}{M_2}\right).$ 3. Apparatus according to claim 2, wherein the first and second center frequencies are in different ones of the O-band, E-band, S-band, C-band, L-band and U-band.

4. Apparatus according to claim 2, wherein the first and second center frequencies are in respectively the C-band and L-band.

5. Apparatus according to claim 2, wherein the first and second center frequencies are in two different sub-bands of a single one of the O-band, E-band, S-band, C-band, L-band and U-band.

6. Apparatus according to claim 2, wherein the first and second orders are related as $M_2=M_1-1$.

7. Apparatus according to claim 2, wherein the first and second channel spacings are substantially equal.

8. Apparatus according to claim 2, wherein the first and second channel spacings are both equal to 50 GHz and the first and second center frequencies both lie substantially on multiples of 50 GHz.

9. Apparatus according to claim 2, wherein the first and second channel spacings are both substantially equal to 50 GHz and the first and second center frequencies both lie on multiples of 50 GHz.

10. Apparatus according to claim 2, wherein the first and second channel spacings are both substantially equal to 50 GHz and the first and second center frequencies both lie substantially on multiples of 50 GHz.

11. Apparatus according to claim 1, wherein the first and second center frequencies are in different ones of the O-band, E-band, S-band, C-band, L-band and U-band.

12. Apparatus according to claim 1, wherein the first and second center frequencies are in respectively the C-band and L-band.

13. Apparatus according to claim 1, wherein the first and second center frequencies are in two different sub-bands of a single one of the O-band, E-band, S-band, C-band, L-band and U-band.

14. Apparatus according to claim 1, wherein the first and second orders are related as $M_2=M_1-1$.

15. Apparatus according to claim 1, wherein the first and second channel spacings are substantially equal.

16. Apparatus according to claim 1, wherein the first and second channel spacings are both equal to 50 GHz and the first and second center frequencies both lie substantially on multiples of 50 GHz.

17. Apparatus according to claim 1, wherein the first and second channel spacings are both substantially equal to 50 GHz and the first and second center frequencies both lie on multiples of 50 GHz.

18. Apparatus according to claim 1, wherein the first and second channel spacings are both substantially equal to 50 GHz and the first and second center frequencies both lie substantially on multiples of 50 GHz.

19. Apparatus according to claim 1, wherein the output free-space region has an output port comprising a plurality of outputs, including first, second and third outputs disposed on the far boundary at the respective angles $\theta_{OP1}$, $\theta_{OP2}$ and $\theta_{OP3}$.

20. Apparatus according to claim 1, wherein the first constant channel spacing is a constant frequency channel spacing.

21. Apparatus according to claim 20, wherein the second constant channel spacing is a constant frequency channel spacing.

22. A method for operating an AWG having first and second inputs and a plurality of outputs, the first and second inputs being addressed to respective first and second different orders of the AWG, comprising the step of providing optical energy into both the first and second inputs simultaneously.

23. A system comprising a first AWG having a plurality of inputs and a set of at least first and second outputs and a second AWG having at least first and second inputs and a plurality of outputs, for use with a transmission path carrying first optical energy from the first output of the first AWG to the first input of the second AWG and from the second output of the first AWG to the second input of the second AWG, wherein the first and second outputs of the first AWG address respectively first and second different orders of the first AWG such that optical energy carried on the first output of the first AWG has a plurality of channels having first desired channel spacing and a first desired center frequency and at the same time optical energy carried on the second output of the first AWG has a plurality of channels having second desired channel spacing and a second desired center frequency; and wherein the first and second inputs of the second AWG address respectively first and second different orders of the second AWG such that optical energy carried on the first input of the second AWG has a plurality of channels having the first channel spacing and the first center frequency and at the same time optical energy carried on the second input of the second AWG has a plurality of channels having the second channel spacing and the second center frequency.

24. A system according to claim 23, wherein the first and second AWGs are fabricated with different sets of technology parameters.

25. A system according to claim 23, further comprising the transmission path, wherein the transmission path comprises a first optical fiber carrying the first optical energy and a second optical fiber carrying the second optical energy.

26. A system according to claim 23, wherein the transmission path comprises a single optical fiber, further comprising:
a first WDM filter/combiner having two inputs in optical communication with respectively the first and second outputs of the first AWG and an output in communication with a first end of the single optical fiber; and
a second WDM filter/combiner having one input in communication with a second end of the single optical fiber and two outputs in optical communication with respectively the first and second inputs of the second AWG.

27. A system according to claim 26, further comprising the transmission path.

* * * * *

UNITED STATES PATENT AND TRADEMARK OFFICE
CERTIFICATE OF CORRECTION

PATENT NO.        : 9,494,735 B2
APPLICATION NO.   : 13/271886
DATED             : November 15, 2016
INVENTOR(S)       : Hindrik F. Bulthuis It is certified that error appears in the above-identified patent and that said Letters Patent is hereby corrected as shown below:

On the Title Page

Add new Title Page with corrected number of claims (attached).

In the Claims

At Columns 19 and 20, delete Claims 22-27.

Signed and Sealed this
Seventh Day of March, 2017

Michelle K. Lee
*Director of the United States Patent and Trademark Office*

(12) United States Patent
Bulthuis

(10) Patent No.: US 9,494,735 B2
(45) Date of Patent: Nov. 15, 2016

(54) AWG SUPPORTING MULTIPLE FREQUENCY BANDS AND CHANNEL PLANS THROUGH RESPECTIVE MULTIPLE INPUTS

(75) Inventor: Hindrik Freerk Bulthuis, Apeldoorn (NL)

(73) Assignee: GEMFIRE CORPORATION, Santa Clara, CA (US)

(*) Notice: Subject to any disclaimer, the term of this patent is extended or adjusted under 35 U.S.C. 154(b) by 675 days.

(21) Appl. No.: 13/271,886

(22) Filed: Oct. 12, 2011

(65) Prior Publication Data
US 2012/0087667 A1 Apr. 12, 2012

Related U.S. Application Data

(60) Provisional application No. 61/392,131, filed on Oct. 12, 2010.

(51) Int. Cl.
G02B 6/12 (2006.01)
H04J 14/02 (2006.01)

(52) U.S. Cl.
CPC ...... G02B 6/12016 (2013.01); G02B 6/12014 (2013.01); H04J 14/0282 (2013.01)

(58) Field of Classification Search
None
See application file for complete search history.

(56) References Cited

U.S. PATENT DOCUMENTS

| | | | |
|---|---|---|---|
| 5,002,350 A | 3/1991 | Dragone | |
| 5,978,532 A * | 11/1999 | Rigny et al. | 385/46 |
| 6,181,849 B1 | 1/2001 | Lin et al. | |
| 6,608,948 B2 | 8/2003 | Dallesasse et al. | |
| 6,678,446 B1 * | 1/2004 | McGreer et al. | 385/37 |
| 7,397,986 B2 | 7/2008 | Bulthuis et al. | |
| 7,440,653 B2 * | 10/2008 | Grek et al. | 385/37 |
| 7,492,991 B2 | 2/2009 | Beelen et al. | |
| 8,285,144 B2 * | 10/2012 | Yamada et al. | 398/79 |
| 2004/0264857 A1 | 12/2004 | Bernasconi | |
| 2005/0152641 A1 | 7/2005 | Han et al. | |
| 2007/0063076 A1 * | 3/2007 | Grek et al. | 385/37 |
| 2011/0052189 A1 * | 3/2011 | Yamada et al. | 398/42 |
| 2012/0087667 A1 * | 4/2012 | Bulthuis | 398/79 |

FOREIGN PATENT DOCUMENTS

| | | |
|---|---|---|
| KR | 20050092683 A | 9/2005 |
| WO | 9723969 A1 | 7/1997 |
| WO | 2010098231 A2 | 9/2010 |

OTHER PUBLICATIONS

Lin et al., "Dual-Channel-Spacing Phased-Array Waveguide Grating Multi/Demultiplexers", IEEE Photonics Technology Letters, vol. 8, No. 11, Nov. 1996.*

(Continued)

Primary Examiner — Andrew Jordan
(74) Attorney, Agent, or Firm — Haynes Beffel Wolfeld LLP

(57) ABSTRACT

Roughly described, an AWG has two or more inputs and multiple outputs. By selecting the angular spacing among the inputs, and by designing the different inputs to address different orders of the waveguide array, the device can be designed such that the inputs will carry frequency bands having any desired center frequency spacing and any desired same or different channel spacing. For example a dual input device can be designed such that one input carries C-band channels and the other input carries L-band channels, and both have channel spacings that match or substantially match the ITU grid.

21 Claims, 14 Drawing Sheets